United States Patent
Lee et al.

(10) Patent No.: US 9,629,002 B2
(45) Date of Patent: Apr. 18, 2017

(54) METHOD AND DEVICE FOR STORING PLMN INFORMATION ON USER EQUPMENT IN WIRELESS COMMUNICATON SYSTEM

(71) Applicant: LG Electronics Inc., Seoul (KR)

(72) Inventors: Youngdae Lee, Anyang-si (KR); Seungjune Yi, Anyang-si (KR); Sunghoon Jung, Anyang-si (KR); Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/344,027

(22) PCT Filed: Mar. 22, 2013

(86) PCT No.: PCT/KR2013/002410
§ 371 (c)(1),
(2) Date: Mar. 10, 2014

(87) PCT Pub. No.: WO2013/141656
PCT Pub. Date: Sep. 26, 2013

(65) Prior Publication Data
US 2014/0235232 A1 Aug. 21, 2014

Related U.S. Application Data

(60) Provisional application No. 61/614,518, filed on Mar. 23, 2012.

(51) Int. Cl.
*H04W 24/02* (2009.01)
*H04W 60/00* (2009.01)
*H04W 76/02* (2009.01)

(52) U.S. Cl.
CPC ........... *H04W 24/02* (2013.01); *H04W 60/00* (2013.01); *H04W 76/028* (2013.01)

(58) Field of Classification Search
CPC ... H04W 24/02; H04W 76/028; H04W 60/00; Y02B 60/50
See application file for complete search history.

(56) References Cited

U.S. PATENT DOCUMENTS

| | | | |
|---|---|---|---|
| 2011/0021195 A1* | 1/2011 | Cormier | H04W 48/18 455/435.2 |
| 2011/0216732 A1* | 9/2011 | Maeda | H04W 4/08 370/329 |

(Continued)

FOREIGN PATENT DOCUMENTS

| | | |
|---|---|---|
| EP | 2702798 A2 | 3/2014 |
| KR | 20100076264 A | 7/2010 |

(Continued)

OTHER PUBLICATIONS

"RFL reporting across PLMNs", 3GPP TSG-RAN WG2 Meeting #76, R2-115927, Nokia Siemens Networks, Nokia Corporation, MediaTek, TeliaSonera, Nov. 2011.

(Continued)

*Primary Examiner* — Chuong A Ngo
(74) *Attorney, Agent, or Firm* — Dentons US LLP (57) ABSTRACT

The present invention relates to a method of saving PLMN (public land mobile network) information of a user equipment in a wireless communication system and apparatus therefor. In particular, the present invention includes the step of determining a selected PLMN among at least one PLMN (public land mobile network), detecting a connection problem for the selected PLMN, and if the connection problem is detected, saving an information on the selected PLMN.

16 Claims, 10 Drawing Sheets

(56) References Cited

U.S. PATENT DOCUMENTS

| | | | | |
|---|---|---|---|---|
| 2012/0020204 A1* | 1/2012 | Morera | ................. | H04W 48/18 370/217 |
| 2012/0039189 A1* | 2/2012 | Suzuki | ................. | H04W 24/10 370/252 |
| 2013/0040634 A1* | 2/2013 | Johansson | ............. | H04W 24/10 455/422.1 |
| 2013/0084910 A1* | 4/2013 | Suzuki | ................. | H04W 24/02 455/515 |
| 2014/0050102 A1* | 2/2014 | Lee | ....................... | H04W 24/10 370/242 |

FOREIGN PATENT DOCUMENTS

| | | |
|---|---|---|
| KR | 1020100076264 | 7/2010 |
| KR | 20100137523 A | 12/2010 |
| KR | 1020100137523 | 12/2010 |
| WO | 2011137108 A1 | 11/2011 |
| WO | 2011157292 A1 | 12/2011 |
| WO | 2012021613 A1 | 2/2012 |
| WO | 2012148195 A2 | 11/2012 |

OTHER PUBLICATIONS

"RFL reporting across PLMNs", 3GPP TSG-RAN WG2 Meeting #77, R2-121121, Nokia Siemens Network, Nokia Corporation, CATT, LG Electronics Inc., MediaTek, TeliaSonera, Mar. 2012.

"Applicability of ePLMN to RFL reporting", TSG-RAN WG2#75, R2-114302, Alcatel-Lucent, Aug. 2011.

Change Request: "The applicability of EPLMN to MDT", 3GPP TSG-WG2 Meeting #75, R2-115058, Huawei, HiSilicon, Oct. 2011.

Nokia Siemens Networks, et al., "RLF reporting across PLMNs", R2-120158, 3GPP TSG-RAN WG2 Meeting #77, Feb. 10, 2012, see section 2.

Samsung et al., "Use of the term "Selected PLMN" in RRC", R2-042185, 3GPP TSG RAN #44, Oct. 8, 2004, see section 2.1.

Nokia Siemens Networks, et al., "RLF reporting across PLMNs", R2-120158, 3GPP TSG-RAN WG2 Meeting #77, Feb. 10, 2012.

Samsung, et al., "Use of the term "Selected PLMN" in RRC", R2-042185, 3GPP TSG RAN2 #44, Oct. 8, 2004.

* cited by examiner

(A) CONTROL-PLANE PROTOCOL STACK (B) USER-PLANE PROTOCOL STACK

METHOD AND DEVICE FOR STORING PLMN INFORMATION ON USER EQUPMENT IN WIRELESS COMMUNICATON SYSTEM

This application is a 35 USC §371 National Stage entry of International Application No. PCT/KR2013/002410, filed on Mar. 22, 2013, and claims priority to U.S. Provisional Application No. 61/614,518, filed Mar. 23, 2012, both of which are hereby incorporated by reference in their entireties as if fully set forth herein.

TECHNICAL FIELD

The present invention relates to a wireless communication system, and more particularly, to a method of saving PLMN (public land mobile network) information of a user equipment in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

Figure 1:
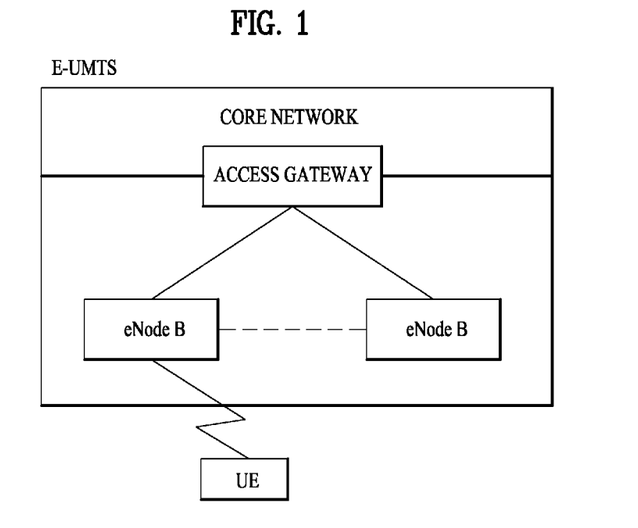
FIG. 1 is a schematic diagram of E-UMTS network structure as an example of a mobile communication system.

FIG. 1 is a schematic diagram of E-UMTS network structure as an example of a wireless communication system. E-UMTS (evolved universal mobile telecommunications system) is the system evolved from an existing UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Tasks

One object of the present invention is to provide a method of saving PLMN (public land mobile network) information of a user equipment in a wireless communication system and apparatus therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of saving PLMN (public land mobile network) information of a user equipment in a wireless communication system according to one embodiment of the present invention includes the step of determining a selected PLMN among at least one PLMN (public land mobile network), detecting a connection problem for the selected PLMN, and if the connection problem is detected, saving an information on the selected PLMN.

Preferably, if the user equipment is successfully registered with the selected PLMN, the selected PLMN may include a registered PLMN (RPLMN).

Preferably, the selected PLMN information may include a PLMN-Identity for the selected PLMN.

Preferably, the selected PLMN information may be saved in VarRLF-Report (variable radio link failure-report) of the user equipment.

Preferably, the method may further include the step of if the selected PLMN corresponds to a registered PLMN (RPLMN), transmitting information on the saved selected PLMN to a base station. More preferably, the selected PLMN information may be transmitted if the user equipment receives an information request from the base station. In this case, the method may further include the step of if the connection problem is detected, saving a measurement value of a radio quality, wherein the saved measurement value of the radio quality is transmitted together with the selected PLMN information.

More preferably, the information on the selected PLMN may be transmitted through an RRC (radio resource control) connection setup complete message. And, the measurement value of the radio quality may include at least one of an RSRP (reference signal received power) and an RSRQ (reference signal received quality).

Preferably, if the connection problem is detected, it may correspond to a case that a specific timer expires. More preferably, the connection problem may include a radio link failure (RLF) or a handover failure.

Advantageous Effects

According to the present invention, information on a radio problem caused before registering a user equipment with PLMN can be saved.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

Figure 2:
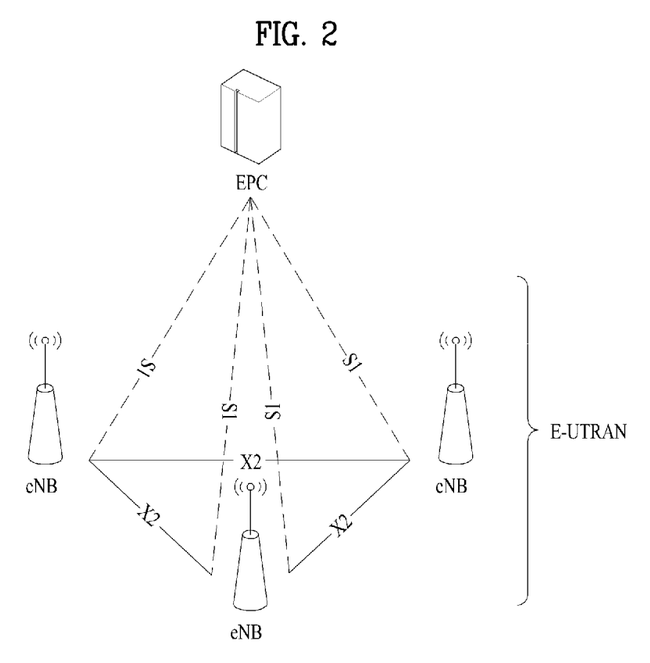
FIG. 2 is a conceptional diagram of a network structure of E-UTRAN (evolved universal terrestrial radio access network).

FIG. 2 is a conceptional diagram of a network structure of E-UTRAN (evolved universal terrestrial radio access network). In particular, the E-UTRAN system is the system evolved from a conventional UTRAN system. The E-UTRAN includes cells (e.g., eNBs). And, the cells are connected via an X2 interface with each other Each of the cell is connected to a user equipment via a radio interface and is also connected to an evolved packet core (EPC) via an S1 interface.

The EPC includes MME (Mobility Management Entity), S-GW (Serving-Gateway) and PDN-GW (Packet Data Network-Gateway). The MME has an access information of a user equipment or an information on capability of the user equipment. Such information is mainly used for management of mobility of the user equipment. The S-GW is a gateway having the E-UTRAN as a terminal end point. And, the PDN-GW is a gateway having a packet data network (PDN) as a terminal end point.

Figure 3:
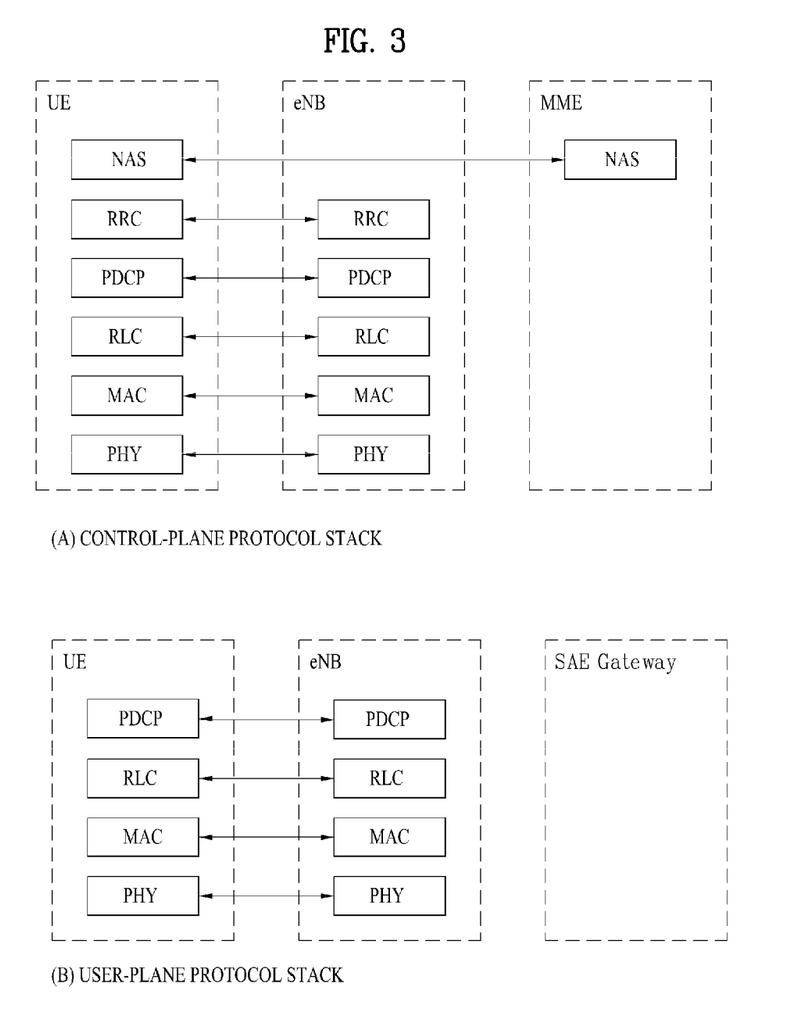
FIG. 3 is a diagram of structures of control and user planes of a radio interface protocol between a user equipment and E-UTRAN based on 3GPP radio access network specification.

FIG. 3 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. To this end, the RRC layer of the user equipment exchanges RRC messages with the RRC layer of the network.

In the following description, an RRC state of a user equipment and a corresponding RRC connecting method are explained. In this case, the RRC state means whether an RRC of a user equipment is logically connected to an RRC of E-UTRAN (i.e., logical connection). If the RRCs are connected to each other, it is called an RRC connected state (RRC_CONNECTED). If the RRCs are not connected to each other, it can be called an RRC idle state (RRC_IDLE).

Since E-UTRAN is able to obtain an existence of a user equipment in an RRC connected state by a cell unit, it is able to effectively control the user equipment. On the contrary, the E-UTRAN is unable to obtain a user equipment in an idle state by a cell unit and the corresponding user equipment is managed by a CN by a TA unit that is an area unit greater than a cell. In particular, in order to receive such a service as voice and data from a cell, a user equipment in an RRC idle state should make a transition to an RRC connected state.

Particularly, when a user initially turns on a power of a user equipment, the user equipment searches for an appropriate cell and then stays in an RRC idle state at the corresponding cell. If the user equipment staying in the RRC idle state needs to establish an RRC connection, it makes a transition to an RRC connected state by performing an RRC connection establishment process. In particular, if the RRC connection needs to be established, it means the case that an uplink data transmission is necessary due to user's call attempt or the like or the case that a response message needs to be sent in case of receiving a paging message from the E-UTRAN.

NAS (non-access stratum) layer situated above RRC layer performs such a function as a session management and a mobility management and the like. In the NAS layer, in order to manage mobility of a user equipment, two kinds of states EMM-REGISTERED (EPS mobility Management-REGISTERED) and EMM-DEREGISTERED. These two states may apply to a user equipment and an MME. A user equipment in an early stage is in EMM-DEREGISTERED state. In order to access a network, this user equipment performs a process for registering with the corresponding network via an initial attach procedure. If the attach procedure is successfully completed, each of the user equipment and the MME enters EMM-REGISTERED states.

In order to manage a signaling connection between a user equipment and an EPC, two kinds of states ECM-IDLE (EPS connection management) and ECM-CONNECTED are defined in the NAS layer. These two states may apply to a user equipment and an MME. If a user equipment in ECM-IDLE state establishes an RRC connection with E-UTRAN, the corresponding user equipment is in ECM-CONNECTED state. If MME in ECM-IDLE establishes S1 connection with E-UTRAN, the corresponding MME enters ECM-CONNECTED state.

When a user equipment is in ECM-IDLE state, E-UTRAN may not have information (context) of the user equipment. Hence, the user equipment in ECM-IDLE state may perform a UE based mobility related procedure such as a cell selection and a cell reselection without receiving a command from a network. On the contrary, when a user equipment in ECM-CONNECTED state, mobility of the user equipment is managed by a command given by a network. If a location of a user equipment in ECM-IDLE state deviates from a location known to a network, the user equipment informs the network of a corresponding location of the user equipment through a tracking area update procedure.

In LTE system, a single cell constructing a base station (eNB) is configured to have one of bandwidths including 1.25 MHz, 2.5 MHz, 5 MHz, 10 MHz, 15 MHz, 20 MHz and the like and provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH).

Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 4:
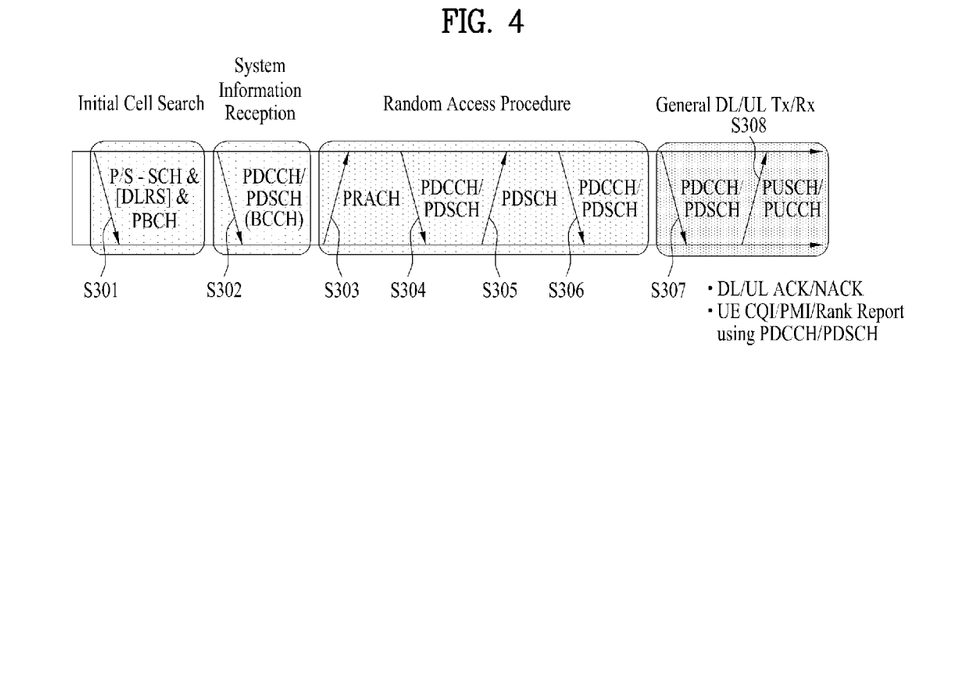
FIG. 4 is a diagram for explaining physical channels used for 3GPP system and a general method of transmitting a signal using the same.

FIG. 4 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S401]. To this end, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S402].

Meanwhile, if the user equipment initially accesses the base station or fails to have a radio resource for signal transmission, the user equipment is able to perform a random access procedure (RACH) on the base station [S403 to S406]. For this, the user equipment transmits a specific sequence as a preamble via a physical random access channel (PRACH) [S403] and is then able to receive a response message via PDCCH and a corresponding PDSCH in response to the preamble [S404]. In case of contention based RACH, it is able to perform a contention resolution procedure in addition.

Having performed the above-mentioned procedures, the user equipment is able to perform PDCCH/PDSCH reception [S407] and PUSCH/PUCCH (physical uplink shared channel/physical uplink control channel) transmission [S408] as a general uplink/downlink signal transmission procedure. In particular, the user equipment receives a downlink control information (DCI) via PDCCH. In this case, the DCI includes such control information as resource allocation information on a user equipment and may differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 5:
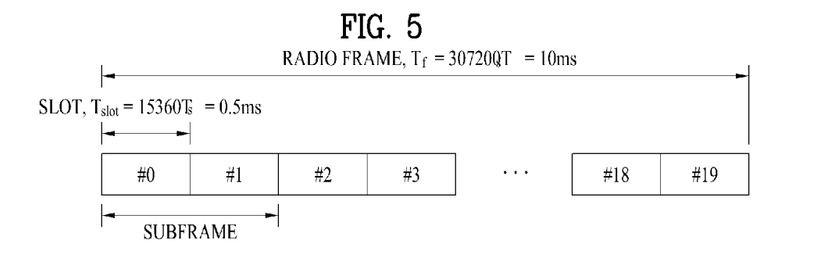
FIG. 5 is a diagram for an example of a structure of a radio frame used for LTE system.

FIG. 5 is a diagram for an example of a structure of a radio frame used by LTE system.

Referring to FIG. 5, a radio frame has a length of 10 ms ($327200 \times T_s$) and is constructed with 10 subframes in equal size. Each of the subframes has a length of 1 ms and is constructed with two slots. Each of the slots has a length of 0.5 ms ($15360 \times T_s$). In this case, $T_s$ indicates a sampling time and is expressed as $T_s=1/(15 \text{ kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 6:
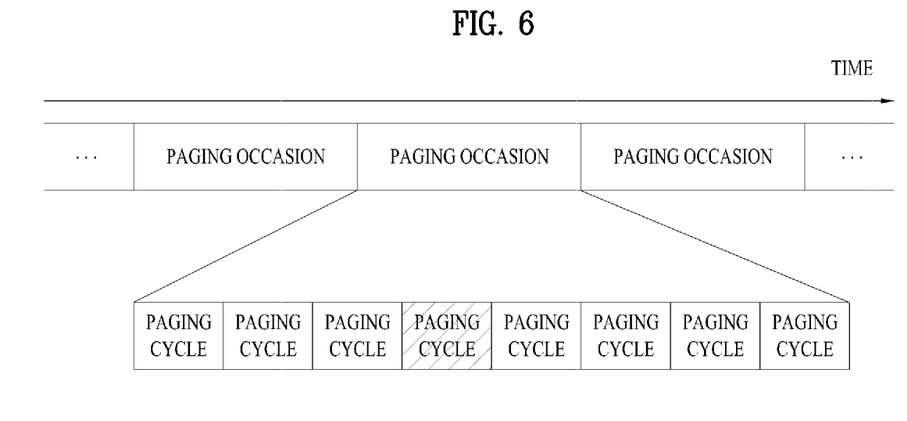
FIG. 6 is a diagram for explaining a general transceiving method using a paging message.

FIG. 6 is a diagram for explaining a general transceiving method using a paging message.

Referring to FIG. 6, a paging message contains a paging cause and a paging record including a UE identity and the like. When the paging message is received, a user equipment is able to perform a discontinuous reception (DRX) for the purpose of power consumption reduction.

In particular, a network configures several paging occasions (POs) for each time cycle called a paging DRX cycle to enable a specific user equipment to obtain a paging message by receiving a specific paging occasion only. The user equipment does not receive a paging channel in a time except the specific paging occasion and is able to stay in a sleep mode to reduce power consumption. And, one paging occasion corresponds to one TTI.

A base station and a user equipment use a paging indicator (PI) as a specific value indicating a transmission of a paging message. The base station defines a specific identity (e.g., paging-radio network temporary identity: P-RNTI) for a usage of the PI and is then able to inform the user equipment of the paging information transmission. For instance, a user equipment wakes up each DRX cycle and then receives one subframe to recognize a presence or non-presence of a paging message. If P-RNTI is contained in L1/L2 control channel (PDCCH) of the received subframe, the user equipment is able to recognize that the paging message exists in PDSCH of the corresponding subframe. If a UE identity (e.g., IMSI) of the user equipment is contained in the paging message, the user equipment makes a response (e.g., RRC connection, system information reception, etc.) to the base station and is then able to receive a service.

In the following description, system information is explained. First of all, the system information should contain necessary information a user equipment should be aware of to access a base station. Therefore, the user equipment should receive all system information before accessing the base station and should have latest system information all the time. Since all user equipments in a cell should be aware of the system information, the base station periodically transmits the system information.

System information can be divided into MIB (Master Information Block), SB (Scheduling Block) and SIB (System Information Block). The MIB enables a user equipment to recognize such a physical configuration of a corresponding cell as a bandwidth and the like. The SB indicates such transmission information of SIBs as a transmission cycle and the like. In this case, the SIB is an aggregate of system informations related to each other. For instance, a specific SIB contains information of a neighbor cell only and another SIB just contains information of a UL radio channel used by a user equipment.

In order to inform a user equipment whether system information has been changed, a base station sends a paging message. In this case, the paging message contains a system information change indicator. The user equipment receives the paging message by paging cycles. If the received paging message contains the system information change indicator, the user equipment receives system information transmitted on a logical channel BCCH.

In the following description, Radio Link Failure (hereinafter abbreviated RLF) is explained.

First of all, if a following problem is caused to a radio link, a user equipment can determine that RLF has occurred.

(1) A user equipment can determine that RLF has occurred due to a physical channel problem.

If a quality of an RS (reference signal) periodically received from an eNB is detected from a physical channel as equal to or smaller than a threshold, a user equipment can determine that out-of-sync has occurred in the physical channel. If the out-of-sync consecutively occurs as many as a specific number (e.g., N310), it is notified to an RRC. Having received an out-of-sync message from a physical layer, the RRC activates a timer T310. Subsequently, the RRC waits for solving a problem of the physical channel while the timer T310 is active. If the RRC receives a message, which indicates that consecutive in-sync has occurred as many times as a specific number (e.g., N310), from the physical layer while the timer T310 is active, The RRC determines that the physical channel problem has been solved and then stops the active timer T310. On the contrary, if the RRC fails to receive the in-sync message until the timer T310 expires, the RRC determines that the RLF has occurred.

(2) A user equipment can determine that RLF has occurred due to MAC Random Access problem.

When a user equipment performs a random access process in an MAC layer, it undergoes steps of a random access resource selection, a random access preamble transmission, a random access response reception and a contention resolution in order. The above-mentioned steps are called one random access process. If this process is not successfully completed, the user equipment waits by a backoff time and then performs a next random access process. However, although the user equipment has attempted the random access process as many times as a predetermined count (e.g., preambleTransMax), if the user equipment fails, the user equipment informs an RRC of the failure. Subsequently, the RRC determines that RLF has occurred.

(3) A user equipment can determine that RLF has occurred due to RLC maximum retransmission problem.

When AM (acknowledged mode) RLC is used in an RLC layer, a user equipment retransmits RLC PDU failing in transmission. Yet, although AM RLC has performed retransmission of specific AMD PDU as many times as a predetermined count (e.g., maxRetxThreshold), if it fails in the transmission, the user equipment informs an RRC of the failure. Subsequently, the RRC determines that RLF has occurred.

The RRC determines the RLC occurrence based on the causes of the 3 types. Thus, once RLF has occurred, RRC connection re-establishment, which is a procedure for re-establishing an RC connection to an eNB, is performed.

The RRC connection re-establishment procedure, which is performed in case of an occurrence of RLF, is described as follows.

First of all, if a user equipment determines that a serious problem is caused to an RRC connection itself, the user equipment performs an RRC connection re-establishment process to re-establish a connection to an eNB. The serious problem caused to the RRC connection may include at least one of four types, i.e., (1) Radio link failure (RLF), (2) Handover failure, (3) PDCP integrity check failure, and (4) RRC connection reconfiguration failure.

If one of the above-mentioned problems is caused, the user equipment activates a timer T311 and then starts an EEC connection re-establishment process. In this process, the user equipment accesses a new cell through a cell selection procedure, a random access procedure and the like.

While the timer T311 is active, if an appropriate cell is found through the cell selection procedure, the user equipment stops the timer T311 and then starts a procedure for an random access to the corresponding cell. On the other hand, if an appropriate cell is not found until the timer T311 expires, the user equipment determines it as an RRC connection failure and then enters an EEC IDLE mode.

Figure 7:
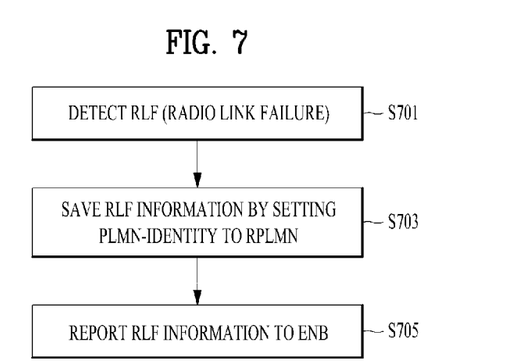
FIG. 7 is a flowchart for a method of saving RLF information according to a related art.

FIG. 7 is a flowchart to describe a method of reporting RLF information to a base station according to a related art.

Referring to FIG. 7, a user equipment in the course of RRC connection to a serving cell detects an RLF (radio link failure) or a handover failure [S701].

If the user equipment detects the RLF, the user equipment saves information related to the connection failure occurrence, e.g., RLF information [S730]. Since the user equipment is not registered with PLMN in the course of the RRC connection yet, the user equipment sets RPLMN in the RLF information to PLMN-identity.

In case that the RLF information is saved, the user equipment reports availability of the RLF information to a base station through an RRC connection reestablishment request message in the course of an EEC connection reestablishment process. Moreover, the user equipment can report availability of the RLF information to the base station through an RRC connection reconfiguration message as well.

If the user equipment fails in the RRC connection reestablishment process, the user equipment enters an idle mode (i.e., RRC_IDLE mode). Subsequently, a UE RRC layer can reenter an RRC connected (RRC_Connected) mode by performing an RRC connection establishment process in response to indication of an NAS layer. In this case, in the RRC connection establishment process, the user equipment can report availability of the RLF information to the base station through an RRC connection establishment complete message. Thus, if the user equipment reports the availability of the RLF information, the base station makes a request for the RLF information to the user equipment by sending a UE information request message.

If the user equipment receives the UE information request message, the user equipment reports the RLF information to the base station through a UE information response message [S705]. In this case, the RLF information may include a channel measurement value of a last serving cell, a channel measurement value of a neighbor cell, an RLF occurring cell information, an RLF occurring location information, an information indicating whether a connection failure is an RLF or a handover failure, an ID of an RRC connection reestablishment attempting cell, and the like.

According to the related art mentioned in the above description, since a user equipment (UE) fails in a wireless connection to a base station, when the user equipment saves VarRLF-Report, the user equipment sets RPLMN (Registered PLMN) to PLMN-Identity. Using the PLMN-Identity, the user equipment determines whether to report the RLF information to the base station. In particular, the object of the reporting operation of the user equipment is to report the RLF occurring PLMN.

Yet, like the case that a previous PLMN is switched to a new PLMN for a user equipment, in case that PLMN is changed, it may happen that RLF for a cell on a new PLMN may occur before completion of a registration with the new PLMN.

In this case, for the PLMN in which the RLF occurs, the user equipment is just able to set a previous RPLMN to PLMN-Identity. In particular, the user equipment has a problem that it is unable to report RLF information, which is supposed to be used for the new PLMN, to the new PLMN. This is because the RLF information is saved for the previous PLMN. Yet, if the user equipment is connected to a cell of the previous PLMN later, the user equipment can report the RLF information to the previous PLMN.

Accordingly, in order to solve the problems of the related art, the present invention proposes a method as follows. First of all, a user equipment selects a network (e.g., PLMN) and then determines whether a problem on radio is detected from a cell of the selected network. If the problem on radio is detected, information on a PLMN selected by upper layers is saved by the user equipment.

According to the present invention, the problem on radio includes a problem of a radio link between a base station and a user equipment and is defined as including an information on a radio link failure occurring in an RRC connection between a user equipment and a serving cell, a problem of RLF (radio link failure) or handover failure and the like.

According to the present invention, if a specific time expires without occurrence of a radio link failure, it can be regarded as detecting a problem on a radio. This is to prevent a success or failure of radio connection from being sustained for a long time in insecure state. If a specific timer expires, it can be determined that a problem on radio is detected. In this case, for example, the specific timer can be defined as a timer set up for a radio connection between a user equipment and a cell like an RRC connection request or an RRC connection reestablishment request.

Figure 8:
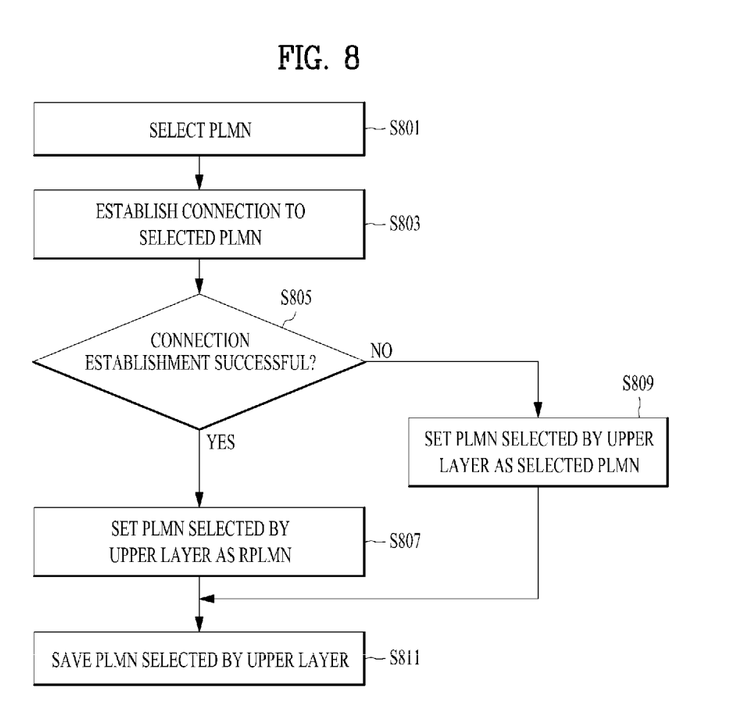
FIG. 8 is a flowchart for a method of saving RLF information according to the present invention.

FIG. 8 is a flowchart for a method of saving RLF information according to the present invention.

Referring to FIG. 8, a user equipment selects a PLMN (public land mobile network) to perform a radio communication [S801]. In particular, while the user equipment is already registered with a specific PLMN, the user equipment can operate for a switching to another PLMN (e.g., a random PLMN selection, a selection made by an NAS layer, etc.). On the other hand, while the user equipment is not registered with any PLMN, the user equipment may make the selection to register with a PLMN.

After completion of the PLMN selection, the user equipment selects a cell and then performs a procedure for camping on the selected cell. In particular, the user equipment establishes a connection to a selected PLMN [Connection establishment] [S803].

According to the present invention, an NAS layer of the user equipment can make a request for an establishment of RRC connection to an RRC layer of the user equipment. In this case, the NAS layer may designate a selected PLMN for the RRC layer. In particular, in establishing the connection to the selected PLMN, the user equipment can designate a PLMN identity included in an RRC connection setup complete message as an identity of the selected PLMN.

Based on the request made by the NAS layer, the RRC layer performs an RRC connection establishment by sending an RRC connection request message to a base station (eNB). In particular, in order to be registered with the selected PLMN, the user equipment performs a procedure for sending an initial NAS message to an MME.

If the user equipment receives an RRC connection setup message from the base station in response to the RRC connection request message, i.e., the connection establishment is successfully completed [S805], the user equipment enters an connected state (RRC_CONNECTED) from an idle state (RRC_IDLE). Hence, after receiving the RRC connection setup message, the user equipment sends an RRC connection setup complete message to the base station (eNB). In this case, a selected PLMN identity corresponds to a PLMN determined by a PLMN selection made by the user equipment. Hence, RPLMN (Registered PLMN) is set to the PLMN selected by an upper layer [S807] and the user equipment makes the selected PLMN identity contained in the RRC connection setup complete message.

In the present specification, for clarity, the description is made centering on the RRC connection setup complete message. Yet, the same principle is applicable to a case of registration with a selected PLMN using an initial NAS message. In particular, after an MME (mobility management entity) has been selected, the same principle is applicable to a case that a base station (eNB) sends an initial NAS message to the MME.

If the user equipment detects a problem on radio in the course of performing a connection establishment step on a cell of the selected PLMN [S805], the user equipment can save PLMN information on the selected PLMN together with information on the problem on radio.

According to the present invention, as mentioned in the foregoing description, the information on the problem on radio corresponds to an information on a problem of a radio link between a base station and a user equipment and can include an information on a radio link failure occurring in an RRC connection and an information on RLF (radio link failure) or handover failure.

The PLMN information can include a PLMN identity.

If the user equipment is in RRC_CONNECTED state, as a problem on radio is detected, the user equipment may fail in a connection to a new PLMN. In this case, since the process for the connection to the selected PLMN, on which the connection establishment is performed, is not completed yet, the user equipment is not registered with the selected PLMN yet. Hence, since the RRC layer of the user equipment is unable to know about RPLMN, the selected PLMN identity is set to a PLMN selected by an upper layer [S809]. In particular, since the user equipment is not registered with any PLMN, the NAS layer of the user equipment does not designate the RPLMN to the RRC layer of the user equipment.

The RRC layer of the user equipment can save the selected PLMN identity or the RPLMN identity as the PLMN selected by the upper layer (e.g., NAS layer) [S811]. For instance, the user equipment can save information related to the PLMN selected by the upper layer in VarRLF-Report variable of the user equipment.

In particular, if the RRC layer of the user equipment corresponds to at least one of a case that a (valid) RPLMN-identity does not exist or that a selected PLMN identity is different from the RPLMN identity, a case that a problem (e.g., RLF, handover failure, etc.) is caused not to a cell of RPLMN but to a cell of a selected PLMN, and a case that the NAS layer of the user equipment does not inform the RRC layer of the user equipment of the RPLMN, the user equipment can save the selected PLMN identity as an information on the PLMN selected by the upper layer (e.g., saved in the VarRLF-Report variable of the user equipment).

Of course, if the selected PLMN identity is not saved as the PLMN selected by the upper layer, the RPLMN can be saved as the PLMN selected by the upper layer.

Therefore, according to the present invention, the PLMN selected by the upper layer can be reported to the base station, whereas RPLMN saved in the user equipment is reported to the base station only in the related art. And, the PLMN selected by the upper layer can become an RPLMN (Registered PLMN) or a selected PLMN.

When the user equipment enters an idle state (RRC_IDLE) from a connected state (RRC_CONNECTED), the user equipment can keep saving the information on the problem on radio and the information on the PLMN selected by the upper layer.

Moreover, in case that the user equipment detects a problem on radio, the user equipment can save a measurement value of a radio quality together with the PLMN information. For instance, the measurement value of the radio quality can include at least one of RSRP (reference signal received power) and RSRQ (reference signal received quality), which are measured for a cell of the selected PLMN.

If the user equipment is registered with PLMN, the user equipment can inform the base station whether information, which is to be reported to a network, on a problem on radio exists. For instance, using the RRC connection setup complete message, the RRC layer of the user equipment can inform the base station whether the information on the problem on radio is saved in the user equipment. Hence, the user equipment sends a message indicating that the information related to the problem on radio is saved to the base station and is then able to receive a request for reporting the corresponding (or saved) information on the problem on radio from the base station.

If the user equipment receives the reporting request from the base station, the user equipment determines whether the saved PLMN information corresponds to the RPLMN and then reports the saved information on the problem on radio to the base station. In doing so, the user equipment can send a reporting message including the information, which is saved in association with the problem on radio, on the PLMN selected by the upper layer.

For instance, if the PLMN selected by the upper layer corresponds to the RPLMN, the RRC layer of the user equipment can send a UE information response message to the base station in response to a UE information request message received from the base station. For another instance, the user equipment can be configured to have a list of PLMN(s) set to report information on a problem on radio. In this case, if the PLMN information saved in the user equipment corresponds to one PLMN in the list of the PLMN(s), the user equipment may report the information on the problem on radio to the network.

Figure 9:
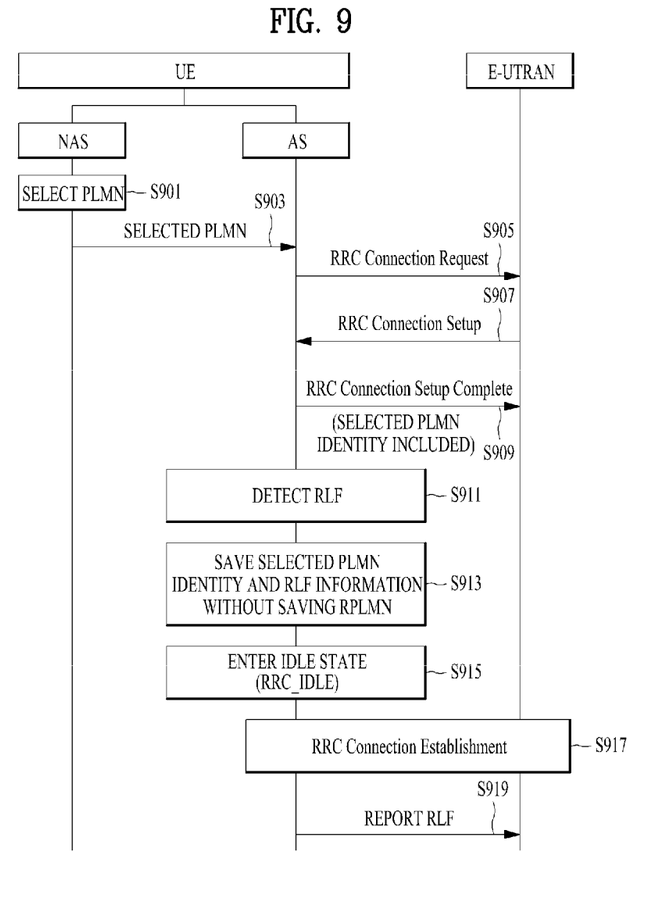
FIG. 9 is a flowchart to describe a case that RLF occurs in the course of RRC connection establishment of a user equipment according to an embodiment of the present invention.

FIG. 9 is a flowchart to describe a case that RLF occurs in the course of RRC connection establishment of a user equipment according to an embodiment of the present invention.

Referring to FIG. 9, an NAS layer of a user equipment determines a selected PLMN by making a PLMN selection to perform an RRC connection establishment [S901]. An AS layer of the user equipment, i.e., an RRC layer receives a designation of a selected PLMN for requesting an RRC connection establishment from the NAS layer of the user equipment [S903].

The user equipment sends an RRC connection request message to a base station selected based on the designated selected PLMN [S905]. If the user equipment receives an RRC connection setup message in response to the RRC connection request message, the user equipment enters an RRC_Connected state [S907].

In the RRC_Connected state, the user equipment sends an RRC connection setup complete message to the base station [S909]. In doing so, as mentioned in the foregoing description, the RRC connection setup complete message can be sent in a manner of containing a selected PLMN identity. Yet, while the RRC connection setup complete message is being sent, a problem (e.g., RLF) on radio may occur. If so, the user equipment detects the RLF [S911].

If the user equipment detects the RLF, the user equipment sets not an RPLM-identity but the selected PLMN-identity as a PLMN information selected by an upper layer. And, the user equipment saves an information on the problem (e.g., RLF information) on radio together with the PLMN information selected by the upper layer [S913]. In doing so, as mentioned in the foregoing description, a measurement value of a radio quality may be contained in the RLF information.

If the user equipment fails in the RRC connection establishment, the user equipment enters an idle state (RRC_IDLE) from the RRC connected state (RRC_Connected) [S915].

When the user equipment completes the RRC connection establishment [S917], if the saved PLMN information matches the RPLMN, as mentioned in the foregoing description, the user equipment reports the RLF information to the base station [S917].

Figure 10:
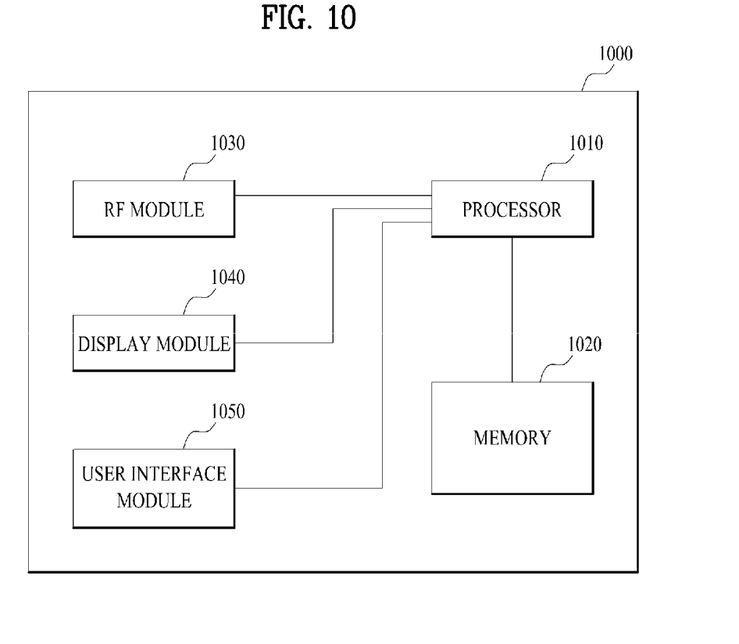
FIG. 10 is a block diagram of a communication device according to an embodiment of the present invention.

FIG. 10 is a block diagram of a communication device according to an embodiment of the present invention.

Referring to FIG. 10, a communication device 1000 includes a processor 1010, a memory 1020, an RF module 1030, a display module 1040 and a user interface module 1050.

The communication device 1000 is illustrated for clarity and convenience of the description and some modules can be omitted. Moreover, the communication device 1000 is able to further include at least one necessary module. And, some modules of the communication device 1000 can be further divided into sub-modules. The processor 1010 is configured to perform operations according to the embodiment of the present invention exemplarily described with reference to the accompanying drawings. In particular, the detailed operations of the processor 1010 can refer to the contents described with reference to FIGS. 1 to 9.

The memory 1020 is connected to the processor 1010 and stores an operating system, applications, program codes, data and the like. The RF module 1030 is connected to the processor 1010 and performs a function of converting a baseband signal to a radio signal or converting a radio signal to a baseband signal. For this, the RF module 1030 performs analog conversion, amplification, filtering and frequency uplink transform or inverse processes thereof. The display module 1040 is connected to the processor 1010 and displays various kinds of informations. The display module 1040 can include such a well-known element as LCD (Liquid Crystal Display), LED (Light Emitting Diode), OLED (Organic Light Emitting Diode) and the like, by which the present invention is non-limited. The user interface module 1050 is connected to the processor 1010 and can include a combination of well-known interfaces including a keypad, a touchscreen and the like.

The above described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of the appended claims or that those claims can be included as new claims by revision after filing an application.

In the present disclosure, embodiments of the present invention are described centering on the data transmission/reception relations between a user equipment and a base station. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of saving PLMN (public land mobile network) information of a user equipment in a wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method of saving PLMN (public land mobile network) information for a user equipment in a wireless communication system, comprising the steps of:
   determining a selected PLMN among at least one PLMN;
   detecting a connection problem related with a cell of the selected PLMN before completion of a registration with the selected PLMN; and
   saving information on the selected PLMN in a VarRLF-Report (variable radio link failure-report) after detecting the connection problem,
   wherein the saved information on the selected PLMN comprises a PLMN-Identity for the selected PLMN corresponding to a registered PLMN when the connection problem is detected, and
   wherein the selected PLMN is provided by the NAS (non-access stratum) layer.

2. The method of claim 1, further comprising the step of:
   transmitting the saved information on the selected PLMN to a base station if the selected PLMN corresponds to a registered PLMN (RPLMN).

3. The method of claim 2, wherein the saved information on the selected PLMN is transmitted if the user equipment receives an information request from the base station.

4. The method of claim 3, further comprising the step of:
   saving a radio quality measurement value, wherein the saved radio quality measurement value is transmitted together with the saved information on the selected PLMN.

5. The method of claim 4, wherein the radio quality measurement value comprises at least one of an RSRP (reference signal received power) and an RSRQ (reference signal received quality).

6. The method of claim 2, wherein the saved information on the selected PLMN is transmitted through an RRC (radio resource control) connection setup complete message.

7. The method of claim 6, wherein the detected connection problem comprises either a radio link failure (RLF) or a handover failure.

8. The method of claim 1, wherein the detected connection problem corresponds to the expiration of a specific timer.

9. A method of saving PLMN (public land mobile network) information in a user equipment (UE) in a wireless communication system, the method comprising:
   selecting a PLMN from among at least one PLMN;
   detecting a connection problem related with a cell of the selected PLMN before completion of a registration with the selected PLMN; and
   saving the PLMN information for the selected PLMN in a VarRLF-Report (variable radio link failure-report) after detecting the connection problem,
   wherein the saved PLMN information comprises a PLMN-Identity for the selected PLMN corresponding to a registered PLMN when the connection problem is detected, and
   wherein the selected PLMN is provided by the NAS (non-access stratum) layer.

10. The method of claim 9, further comprising:
    receiving an information request from the base station, wherein the transmission of the saved PLMN information is in response to the information request.

11. The method of claim 9, wherein the saved PLMN information is transmitted through an RRC (Radio Resource Control) connection setup complete message.

12. The method of claim 9, further comprising:
    saving a radio quality measurement value, wherein the saved radio quality measurement value is transmitted to the base station with the saved PLMN information.

13. The method of claim 9, wherein the detection of the connection problem corresponds to the expiration of a specific timer.

14. The method of claim 9, wherein the detected connection problem relates to a radio link failure (RLF) or a handover failure.

15. A user equipment (UE) in a wireless communication system, the UE comprising:
    an RF (radio frequency) module;
    a memory; and
    a processor that:
    requests a connection with a selected PLMN (public land mobile network),
    detects a connection problem related with a cell of the selected PLMN before completion of a registration with the selected PLMN; and
    saves, in the memory, PLMN information for the selected PLMN in a VarRLF-Report (variable radio link failure-report) after the detection of the connection problem,
    wherein the saved PLMN information comprises a PLMN-Identity for the selected PLMN corresponding to a registered PLMN when the connection problem is detected, and
    wherein the selected PLMN is provided by the NAS (non-access stratum) layer.

16. The UE of claim 15, wherein the processor selects the PLMN from among at least one PLMN.

* * * * *